United States Patent [19]
Woo

[11] Patent Number: 5,255,189
[45] Date of Patent: Oct. 19, 1993

[54] METHOD AND SYSTEM FOR RETRIEVING IDEOGRAPHIC CHARACTERS AND THE ASSOCIATED DICTIONARY ENTRIES

[76] Inventor: Edward P. H. Woo, 22A Kennedy Road 2nd Floor, Hong Kong, Hong Kong

[21] Appl. No.: 896,480

[22] Filed: Jun. 9, 1992

[51] Int. Cl.$^5$ .................... G06F 15/38; G06G 7/60
[52] U.S. Cl. .................................... 364/419.19
[58] Field of Search .................... 364/419; 382/13, 9

[56] References Cited

U.S. PATENT DOCUMENTS

| | | | |
|---|---|---|---|
| 4,298,957 | 11/1981 | Duvall et al. | 364/900 |
| 4,484,305 | 11/1984 | Ho | 364/900 |
| 4,602,878 | 7/1986 | Merner et al. | 400/110 |
| 4,829,593 | 5/1989 | Monroe et al. | 382/13 |
| 4,873,625 | 10/1989 | Archer et al. | 364/200 |
| 4,903,311 | 2/1990 | Nakamura | 382/9 |
| 4,937,745 | 6/1990 | Carmon | 364/419 |
| 4,972,496 | 11/1990 | Sklarew | 382/13 |
| 5,034,989 | 7/1991 | Loh | 382/13 |
| 5,050,121 | 9/1991 | Vaughan | 364/900 |

Primary Examiner—Donald E. McElheany, Jr.
Attorney, Agent, or Firm—Townsend and Townsend Khourie and Crew

[57] ABSTRACT

A method and system for retrieving ideographic characters such as Chinese characters wherein a computer displays a set of four questions relating, respectively, to the geometrical characteristics of the first and last strokes and any geometrical enclosures of the character to be searched and its total number of strokes. The computer also displays a fifth optional question relating to the number of crosses each formed by two strokes in the character. The user selects among the various choices for the character. Upon each selection by the user, the computer conducts a search eliminating characters that do not correspond to the characteristic description selected. After the search is completed, the computer displays all characters having the selected characteristics and a total number of strokes within a predetermined range of that entered by the user to accommodate for possible counting errors. If too many characters are displayed, the user may enter the answer for the fifth optional question. In that case, the computer conducts a further search to eliminate those that do not meet the description and display those that do. Thus, only fewer characters are displayed for efficient identification by the user. The computer then displays the corresponding pronunciation and explanation entries for the character like any conventional dictionaries.

51 Claims, 5 Drawing Sheets

FIG. 1A.

| | SERIAL NO. | CHARACTER | FIRST STROKE | LAST STROKE | GEOMETRICAL ENCLOSURE | | TOTAL NUMBER OF STROKES | NUMBER OF CROSSES |
|---|---|---|---|---|---|---|---|---|
| (a) | XXX | 右 | 一 | 一 | ロ | ... | 5 | 1 |
| (b) | XXX | 田 | 丨 | 一 | 田 | ... | 5 | 1 |
| (c) | XXX | 女 | ノ | 一 | 女 | ... | 3 | 2 |
| (d) | XXX | 署 | 丨 | 一 | ロ | 日 | ... | 13 | 2 |
| (e) | XXX | 乙 | 一 | ∪ | — | ... | 1 | 0 |

*FIG. 1B.*

1. FIRST STROKE: (a) 一  (b) 丨  (c) 丶  (d) ノ

2. LAST STROKE: (a) 一  (b) 丨  (c) 丶  (d) ノ (J)   (e) \ (しし〜)

3. GEOMETRICAL ENCLOSURES: (a) NONE  (b) 口  (c) 日  (d) 冂  (e) 目  (f) 皿 (四)
   (g) 田  (h) 国  (i) 凸, 女, 及 ...

4. NO. OF STROKES: __

5. NO. OF CROSSES: __
   (OPTIONAL)

GEOMETRICAL ENCLOSURES: (a) NONE  (b) 口  (c) 日, 冂  (d) 目, 皿, 田  (e) 国, 回
   (e) 凸, 女, 及 ...

METHOD AND SYSTEM FOR RETRIEVING IDEOGRAPHIC CHARACTERS AND THE ASSOCIATED DICTIONARY ENTRIES

BACKGROUND OF THE INVENTION

The invention relates generally to a method and system for retrieving characters from a data base. More particularly, it relates to a method and system for retrieving ideographic characters such as Chinese characters from a dictionary data base in accordance with input information relating to a selected set of geometrical characteristics and the total number of strokes of a character to be searched. The invention effectively retrieves fewer characters for efficient identification of a desired one by the user.

Unlike English, there is no alphabet in Chinese. Chinese characters are made up of strokes. The strokes are quite irregular in shape. Varieties are plentiful. Thus, it is very difficult to search for a particular character in a dictionary. In conventional dictionaries, the first part or sometimes the most prominent part, called "bosau" of each character is isolated from the character. Bosau with the same number of strokes are arranged in the same group. Characters having the same bosau are arranged in the same group. Characters with less strokes are arranged before those with more strokes in each group. To search for a particular character from a conventional dictionary, one must first identify the correct bosau for that character and then run through the list of the characters with the same bosau bearing in mind the number of strokes.

There are several disadvantages to the conventional dictionaries. First, there are more than 200 bosaus in a standard Chinese dictionary. Although bosaus with the same number of strokes are arranged in the same group, it is often difficult to identify the right bosau in a particular character. There are characters which should fall within a group of characters with one particular bosau according to common sense, but for no apparent reason fall within another group of characters with a different bosau. Therefore, sometimes it is quite confusing and oftentimes one cannot find the right character even after spending a great deal of time.

SUMMARY OF THE INVENTION

The invention provides a method and system for retrieving ideographic characters, such as Chinese characters, from a dictionary data base. The dictionary data base of the invention stores a collection of characters, along with their corresponding pronunciation and explanation entries. The dictionary data base is prearranged so that each character is associated with a plurality of memory field specifying a selected set of geometrical characteristics and its total number of strokes. In accordance with the invention, a computer system makes use of input information provided by user regarding the geometrical characteristics and the total number of strokes of the character to be searched. The computer searches and retrieves all characters meeting the characteristic descriptions and having a particular number of strokes within a predetermined range of the provided total number for identification of the desired character by the user.

According to one aspect of the invention, the computer requests the user to specify a selected set of geometrical characteristics and the total number of strokes of the character to be searched. The selected set of geometrical characteristics comprises the characteristics of the first and last strokes, and any geometrical enclosures within the character. The selected set additionally includes an optional question relating to the number of crosses formed by two strokes in the character. The invention recognizes that the first stroke of any Chinese character is one of only four alternatives and that the last stroke is one of only five alternatives. Additionally, the invention recognizes that most Chinese characters contain fully-enclosed geometrical enclosures of a limited number of types.

According to another aspect of the invention, by process of elimination, the computer searches through the data base. The computer then retrieves and displays all characters having the selected set of geometrical characteristics same as those specified by the user and a particular number of strokes within a predetermined range of the total number provided by the user. Thus, even if the user makes a mistake regarding the exact total number of strokes for the character, the system accommodates for such mistakes and still searches for characters that include the right one.

According to a further aspect of this invention, if too many characters have been retrieved and are displayed for identification, the user may choose to answer the optional question so that the computer can make a further elimination. After the user identifies the right character, the computer displays the corresponding pronunciation and explanation entries for the character like any conventional dictionary.

The further understanding of the nature and advantages of the invention may be realized by reference to the remaining portions of the specification and the drawings.

DESCRIPTION OF THE PREFERRED EMBODIMENTS

Figure 1A:
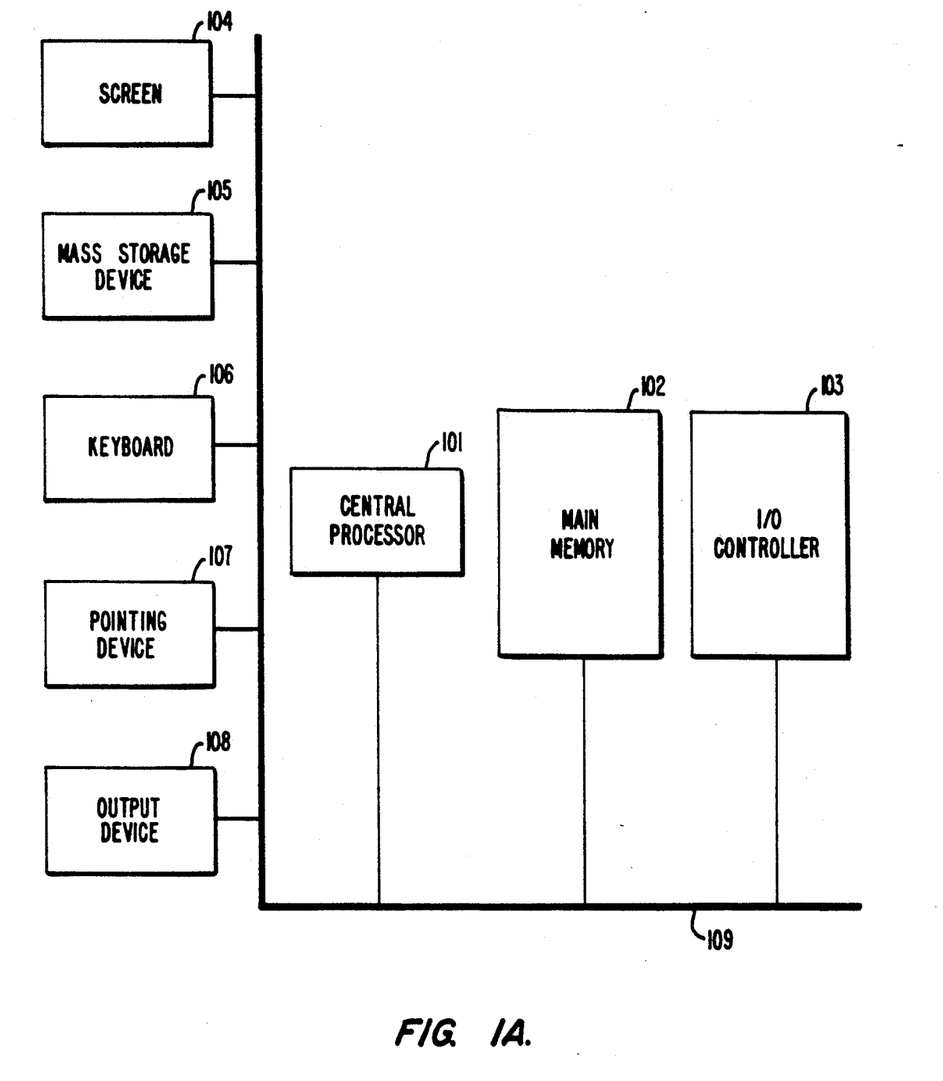
FIG. 1A is a block diagram of a computer system in which the invention be embodied.

The invention may be embodied on a computer system such as system 100 of FIG. 1A, which comprises a central processor 101, a main memory 102, an I/O controller 103, a screen or display 104, a mass storage device 105, a keyboard 106, a pointing device 107, and an output device 108. The various components of the system 100 communicate through a system bus 109 or similar architecture.

In operation, the user enters commands through keyboard 106 and/or pointing device 107, which may be a mouse, a track ball, a digitizing tablet, or the like. The computer displays ideographic characters, such as Chinese characters, and other data through screen 104, such as a cathode ray tube. A hard copy of the characters on screen 104 may be obtained from output device 108, which is typically a printer or a plotter. In a preferred embodiment, an appropriately programmed IBM PC-compatible personal computer (available from International Business Machines, Corp. of Armonk, N.Y.) is used running under MS-DOS ® and Windows ® (available from Microsoft, Corp. of Redmond, Wash.).

Figure 1B:
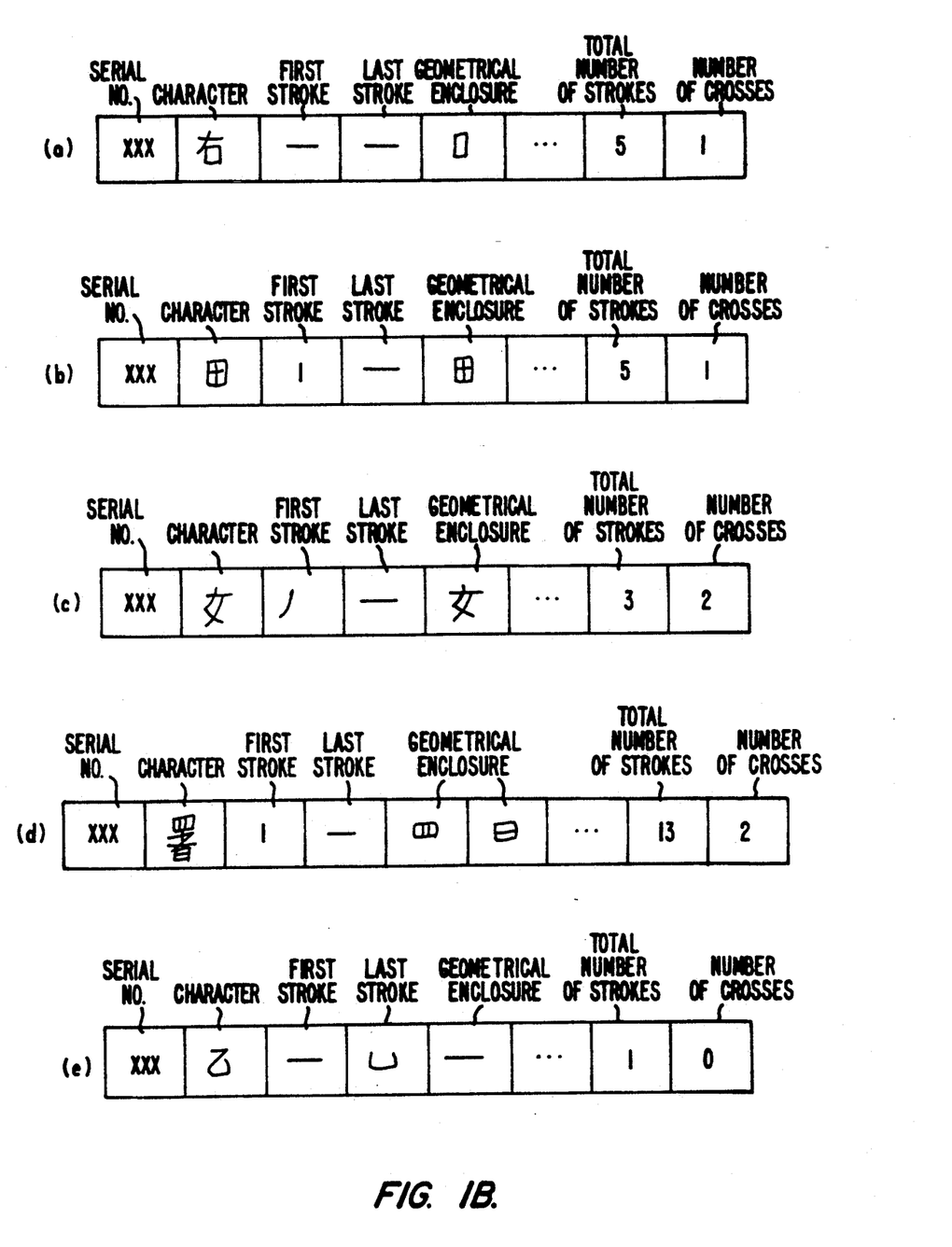
FIG. 1B illustrates a few examples of how characters are stored along with their associated memory fields specifying the selected characteristics and the total number of strokes in the dictionary data base of the invention.

The invention includes a data base which stores a collection of approximately 11,500 characters in their original shapes and their corresponding pronunciation and explanation entries in a memory, such as main memory 102. The simplified characters used in the People's Republic of China (PRC) are also stored in the data base. Each traditional character and its corresponding simplified version, if any, are stored side by side and are assigned the same serial number except that the letter "A" is attached to the serial number for the simplified version. FIG. 1B illustrates a few examples of how characters are stored in the dictionary data base. These characters are prearranged so that each character in the data base is associated with a plurality of memory fields specifying a selected set of geometrical characteristics of the character. These characteristics include those of the first and last strokes and any geometrical enclosures of the character to be searched, its total number of strokes, and the number of crosses each formed by two strokes in the character, if any. The stored characteristics of the first and last strokes of a character are based on the standard order of writing and are well-documented in conventional dictionaries, along with its total number of strokes. If the first stroke is complex, then the characteristic of its first part is stored. Similarly, if the last stroke is complex, then the characteristic of its last part is stored. Entry (e) of FIG. 1B illustrates an example of a character having complex first and last strokes. These characteristics will be explained in more detail below.

Figure 2A:
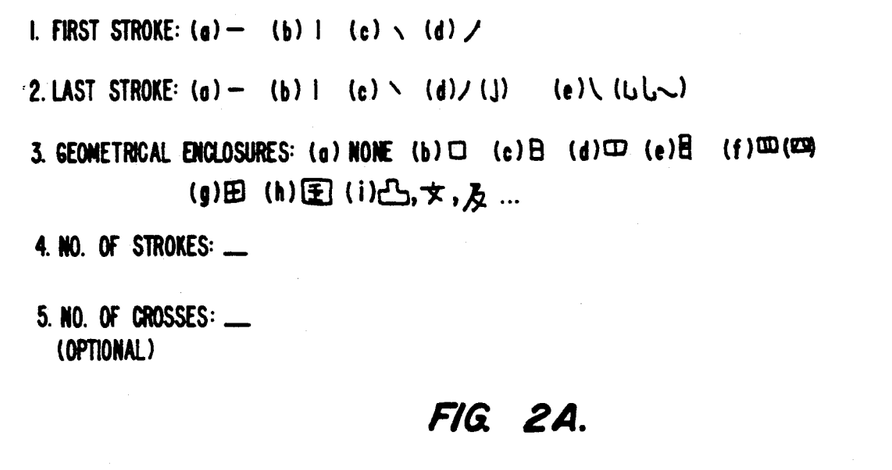
FIG. 2A shows a set of five questions that are displayed on the screen when the computer is ready to conduct a search for a character.

In this interactive computer system, after the user selects the word searching function for retrieving a particular character and the corresponding dictionary entries, screen 104 displays a set of questions relating to the selected set of geometrical characteristics of the character along with preselected multiple choice answers and its total number of strokes, as shown in FIG. 2A.

With reference to FIG. 2A, the invention recognizes that the first stroke of any Chinese character is one of only four alternatives illustrated in the first row of FIG. 2A, namely (a) a horizontal stroke, (b) a vertical stroke, (c) a relatively small, inverse slash-shaped stroke or a dot, and (d) a curved slash-shaped stroke that moves downward slanting to the left. The invention also recognizes that the last stroke of any Chinese character is one of only five alternatives illustrated in the second row of FIG. 2, namely (a) horizontal stroke, (b) a vertical stroke, (c) a relatively small, inverse slash-shaped stroke or a dot, (d) a curved slash-shaped stroke that moves downward slanting to the left or its variations and (e) a curved, inverse slash-shaped stroke that moves downward slanting to the right or its variations. The variations for choices (d) and (e) of the last stroke appear in the parentheses.

Furthermore, the invention recognizes that most Chinese characters contain fully-enclosed geometrical enclosures of a limited number of types as shown in the third row of FIG. 2A. These various choices for the geometrical enclosures are explained below in Table 1.

TABLE 1

| Choice | Explanation |
| --- | --- |
| (a) | No fully-enclosed geometrical enclosures. |
| (b) | At least one fully-enclosed geometrical enclosure, such as a square or rectangle with no strokes inside. |
| (c) | At least one fully-enclosed geometrical enclosure, such as a square or rectangle with one vertical stroke inside. |
| (d) | At least one fully-enclosed geometrical enclosure, such as a square or rectangle with one horizontal stroke inside. |
| (e) | At least one fully-enclosed geometrical enclosure, such as a square or rectangle with two vertical or substantially vertical strokes inside. |
| (f) | At least one fully-enclosed geometrical enclosure, such as a square or rectangle with two horizontal strokes inside. |
| (g) | At least one fully-enclosed geometrical enclosure, such as a square or rectangle with two strokes forming a cross inside. |
| (h) | At least one fully-enclosed geometrical enclosure, such as a square or rectangle with more than two strokes inside. |
| (i) | At least one fully-enclosed, irregular geometrical enclosure. |

The fourth row in FIG. 2A relates to the total number of strokes of the character. This number need not be absolutely accurate since the invention accommodates for marginal errors as will be explained below. The fifth row in FIG. 2A is an optional question. It relates to the number of crosses formed by two strokes in the character. This question excludes two strokes forming a "T" shape in the character.

The user uses keyboard 106 or mouse 107 to move the cursor to choose among the different choices. The user first specifies the characteristic of the first stroke for the character by making a proper selection among the answers for the first question. Once the selection is made, the computer conducts a search through the memory fields containing the first strokes for all characters in the dictionary data base. Only those characters in the data base with the first stroke corresponding to the selected characteristic are selected to form a first group for further screening. The remaining characters are eliminated. In the meantime, the user specifies the characteristic of the last stroke for the character by making another proper selection among the answers for the second question. In a similar manner, based on the last selection, the computer searches through the memory fields containing the last strokes for the characters in the first group. Only those characters in the first group with the last stroke corresponding to the selected characteristic are selected to form a second group for further screening. The remaining characters are again eliminated. While the computer is conducting the search, the user specifies the characteristics of any geometrical enclosures within the character by making all applicable selections among the various choices for the third question because a character may contain more than one type of geometrical enclosures. In selecting the geometrical enclosures, the user must specify the largest possible enclosures within the character as a whole, rather than as smaller individual enclosures. See FIG. 1B, entry (b), for example, where the character includes a geometrical enclosure with a cross inside. It must not be considered as including four small enclosures with no strokes inside. Upon receiving the specified choices for the geometrical enclosures, the computer searches through the memory fields containing the geometrical enclosures for all characters in the second group. Only those characters in the second group with all the geometrical enclosures corresponding to the specified ones are selected to form a third group for further screening. The remaining characters are once again eliminated. In the meantime, the user enters the total number of strokes for the character. Upon receiving the total number, the computer searches through the memory fields containing the total number of strokes for the characters in the third group. Only those characters in the third group with the same total number of strokes as that entered or within a predetermined range of the entered are selected to form a fourth group for any possible further screening. In a preferred embodiment, to accommodate for possible errors of counting the correct total number of strokes, the predetermined range is between one stroke less to one stroke more than that entered by the user.

After the search is completed, the computer displays on screen all characters in the fourth group for identification of the character by the user. At this time, if only a few characters are displayed on screen, the user may choose not to answer the fifth optional question. On the other hand, if the user finds too many characters displayed on screen, he or she may enter the answer by specifying the number of crosses in the character. In the latter case, the computer conducts a similar search to further eliminate characters in the fourth group that do not correspond to this description and displays those that do as a fifth group. The user next identifies the right character from the screen. The computer then displays the corresponding pronunciation and explanation entries for the character like any conventional dictionary.

Figure 2B:
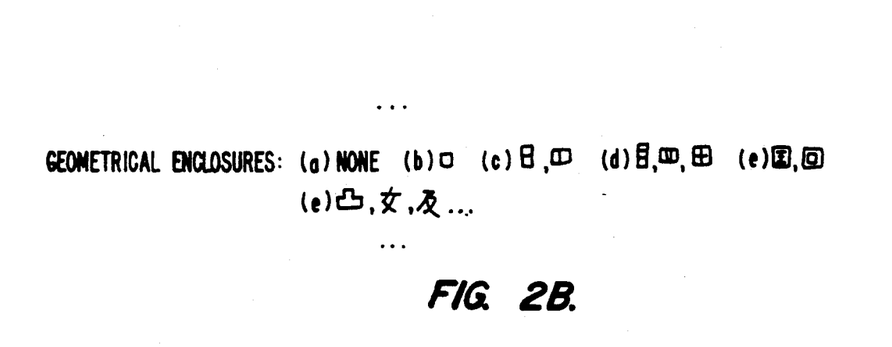
FIG. 2B a substitute question for the third question in FIG. 2A in another embodiment with the other questions same as shown in FIG. 2A.

The simplified characters used in the PRC can be retrieved from the dictionary data base in the same way as described above. According to the invention, the computer treats all characters, simplified or traditional, in the same way in conducting searches. The traditional and simplified characters are separately displayed on the screen with the traditional ones appearing before the simplified ones. Whether the user wants to find a traditional character or a simplified one, the computer will display both versions of the same character, with the simplified one included in a parenthesis. In another embodiment, the computer displays the same five questions as shown in FIG. 2A except that the set of multiple choice answers relating to the geometrical enclosures of the character comprises six choices as shown in FIG. 2B and explained below in Table 2.

TABLE 2

| Choice | Explanation |
| --- | --- |
| (a) | No fully-enclosed geometrical enclosures. |
| (b) | At least one fully-enclosed geometrical enclosure, such as a square or rectangle with no strokes inside. |
| (c) | At least one fully-enclosed geometrical enclosure, such as a square or rectangle with one stroke inside. |
| (d) | At least one fully-enclosed geometrical enclosure, such as a square or rectangle with two strokes inside. |
| (e) | At least one fully-enclosed geometrical |

TABLE 2-continued

| Choice | Explanation |
| --- | --- |
| | enclosure, such as a square or rectangle with more than two strokes inside. |
| (f) | At least one fully-enclosed irregular geometrical enclosure. |

Figure 3A:
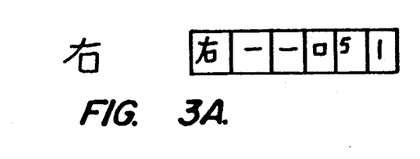
FIGS. 3A-3F illustrate the search process of the invention when the character shown in FIG. 3A is searched.
Figures 3B, 3C:
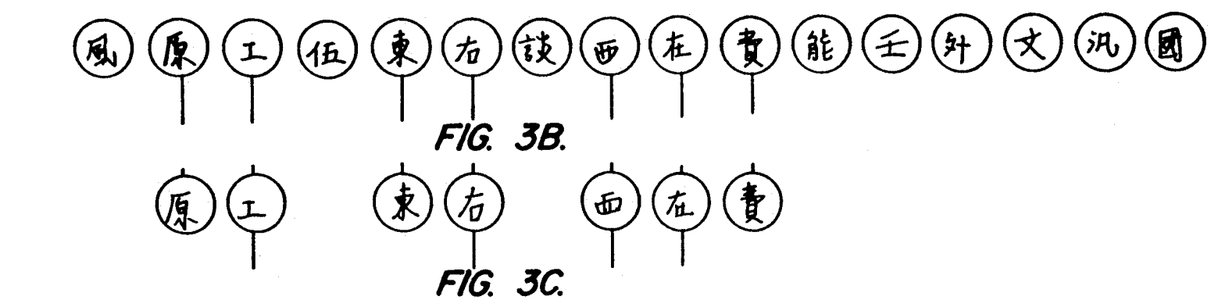

The invention can be best understood by way of an example. Assume the character having the geometrical characteristics and total number of strokes shown in FIG. 3A is to be searched from a dictionary data base containing, for a collection of 16 characters shown in FIG. 3B. The computer first displays the set of questions shown in FIG. 2A. The user first selects choice (a) for the question relating to the first stroke. Based on this choice, the computer searches through the list in FIG. 3B and eliminates characters that do not meet this description. Thus, a first group of only seven characters are selected for further screening, as shown in FIG. 3C.

Figure 3D:
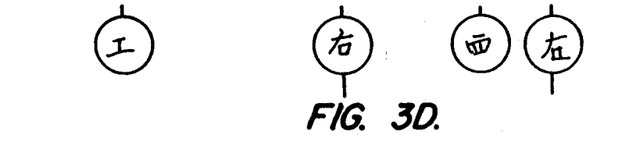
Figure 3E:
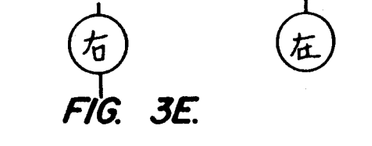
Figure 3F:
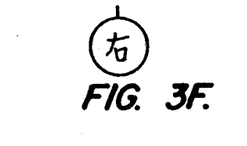

In the meantime, the user selects choice (a) for the question relating to the last stroke. The computer then conducts a further search through the seven characters in FIG. 3C and eliminates characters that do not meet this description. Thus, a second group of only four characters shown in FIG. 3D are selected for further screening. While the search is being conducted, the user selects choice (b) for the question relating to geometrical enclosures within the character. The computer performs another search based on this choice. In this second group shown in FIG. 3D, only two characters meet the description and are thus selected to form a third group for still further screening as shown in FIG. 3E. The remaining two characters are eliminated. In the meantime, the user enters "5" for the question relating to the total number of strokes. The computer then conducts another search through the two characters in FIG. 3E based on the total number of strokes. In this example, only one character shown in FIG. 3E has a total number of five strokes. Thus, this character is displayed on the screen. Since only one character—the right one—is displayed on the screen, the user need not answer the fifth optional question for further elimination. After the user identifies this character, the computer displays the corresponding pronunciation and explanation entries like any conventional dictionary.

Figure 4:
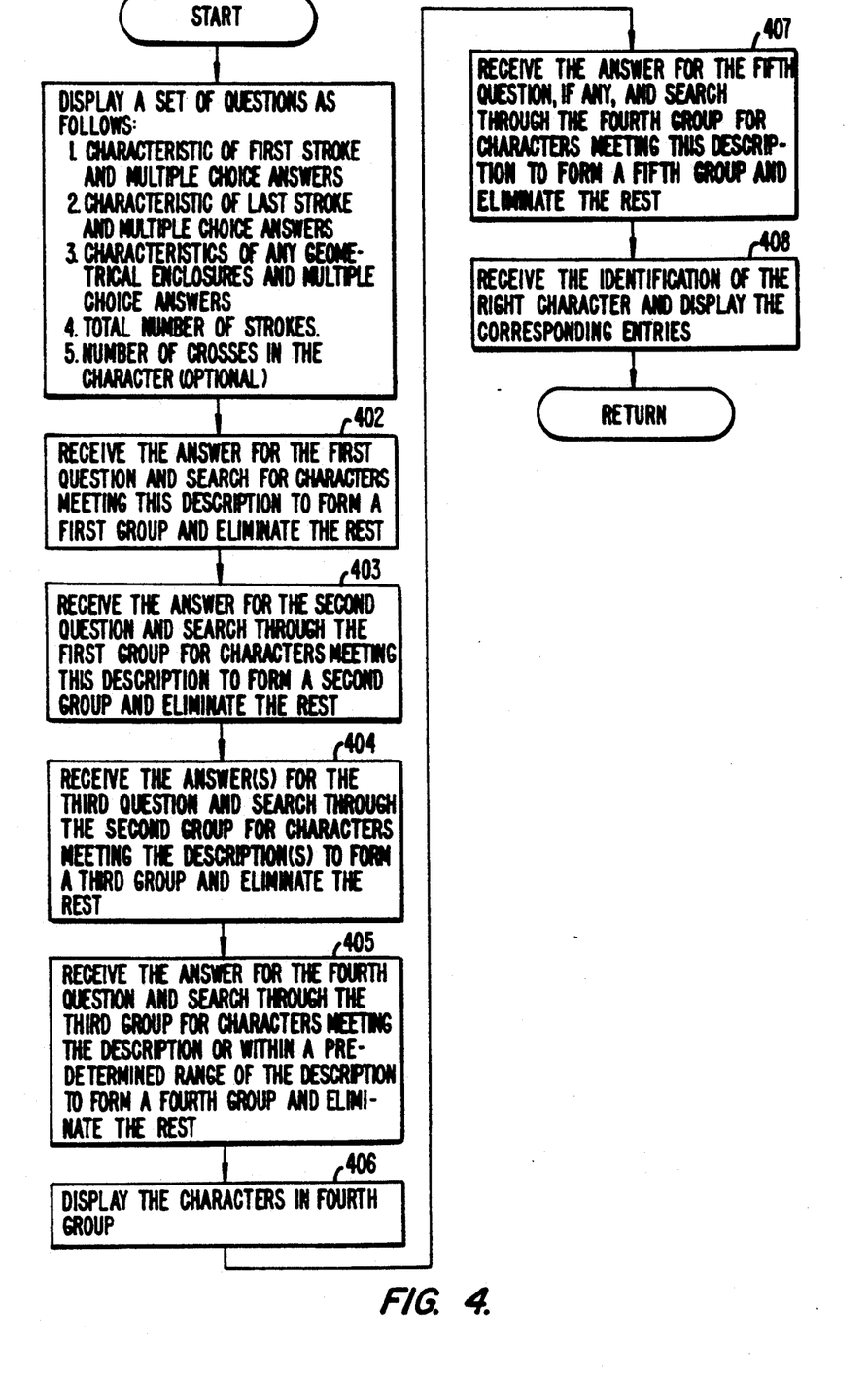
FIG. 4 illustrates the invention by a flow chart.

FIG. 4 illustrates the invention by a flow chart. In step 401, the computer displays on screen four questions relating to the geometrical characteristics of the first and last strokes, and any fully-enclosed geometrical enclosures of the character to be searched, as well as its total number of strokes, and an optional question relating to the number of crosses each formed by two strokes in the character. In addition, for each of the first three questions relating to the first and last strokes and any geometrical enclosures of the character, the computer also displays a set of associated multiple choice answers. In step 402, upon receiving the choice for the characteristic of the first stroke specified by the user, the computer searches for all characters in the dictionary data base having the same kind of first stroke as received to form a first group for further screening and eliminates the rest. In step 403, upon receiving the choice for the characteristic of the last stroke specified by the user, the computer searches through the first group. Only those characters having the same kind of last stroke as received are selected to form a second group. The remaining ones are eliminated. In step 404, upon receiving the choices for the geometrical enclosures specified by the user, the computer searches through the second group. Only those characters that have the same geometrical enclosures as received are selected to form a third group. The remaining ones are again eliminated. In step 405, upon receiving the total number of strokes entered by the user, the computer searches through the third group. Only characters having the same total number, or one stroke more or less than that entered are selected to form a fourth group. In step 406, the computer displays the characters in the fourth group on screen for identification by the user. At this time, if only a few characters are displayed, the user may choose to skip the fifth optional question and identify the right character. On the other hand, if the user finds too many characters displayed on the screen, he or she may enter the answer. In the latter situation, shown as step 407 in FIG. 4, the computer conducts the final search through the fourth group to form a fifth group. Only those characters having the exact number of crosses are displayed on the screen for identification by the user. After the user identifies the right character in step 408, the computer then displays the corresponding pronunciation and explanation entries for the character like any conventional dictionary. Now, the computer is ready for conducting another search for a different character.

While the invention is described with reference to the preferred embodiments, various substitutions and modifications are apparent to person skilled in the relevant arts. For example, the memory fields associated with each character in the data base need not store the exact geometrical characteristics for the character. They may simply store numeral and/or letter designations for those characteristics. Also, other kinds of ideographic characters similar to Chinese characters can be retrieved in a similar fashion. Accordingly, the invention is not intended to be limited except as provided by the appended claims.

What is claimed is:

1. A method for retrieving characters from a data base in which a selected set of geometrical characteristics and the total number of strokes of each character are specified and stored, comprising the steps of:
   (a) requesting a user to specify the selected set of geometrical characteristics including characteristics of any geometrical enclosures of a character to be searched and total number of strokes of said character;
   (b) searching through said data base for all characters having the selected set of geometrical characteristics same as those specified by the user and a particular number of strokes within a predetermined range of said total number including said total number; and
   (c) retrieving all said characters for identification of said character by the user.

2. The method of claim 1 wherein in step (b) said predetermined range is between one stroke less to one stroke more than said total number.

3. The method of claim 1 wherein said selected set of geometrical characteristics further comprises the characteristic of a first stroke of said character.

4. The method of claim 1 wherein said selected set of geometrical characteristics further comprises the characteristic of a last stroke of said character.

5. The method of claim 1 wherein said selected set of geometrical characteristics further comprises the characteristics of a first stroke and a last stroke of said character.

6. The method of claim 5 wherein step (b) comprises:
   searching through said data base for all characters having a first stroke same as that specified by the user to form a first group;
   searching through said first group for all characters having a last stroke same as that specified by the user to form a second group;
   searching through said second group for all characters having geometrical enclosures same as those specified by the user to form a third group; and
   searching through said third group for all characters having particular number of strokes within said predetermined range of said total number to form a fourth group.

7. The method of claim 6 further comprising: displaying all characters in said fourth group for identification of said character by the user.

8. The method of claim 7 wherein step (a) comprises allowing the user to have an option to the specify number of crosses each formed by two strokes in said character if the user finds that said fourth group includes many characters and wherein step (b) further comprises searching through said fourth group for all characters having a number of crosses same as that specified by the user to form a fifth group.

9. The method of claim 8 further comprising displaying all characters in said fifth group for identification of said character by the user.

10. The method of claim 9 wherein step (a) further comprises:
    displaying at least four questions relating, respectively, to the characteristic of said first stroke, the characteristic of said last stroke, the characteristics of any geometrical enclosures, and said total number of strokes, and an optional question relating to said number of crosses and
    displaying at least three sets of preselected multiple choice answers with each set associated with one of said questions relating to said first and last strokes and said any geometrical enclosures for identification by the user.

11. The method of claim 10 further comprising displaying said character in both traditional and simplified versions and its corresponding pronunciation and explanation entries.

12. A method for retrieving characters from a data base storing a collection of characters, comprising:
    (a) prearranging said data base so that each character in said data base is associated with a plurality of memory fields specifying a selected set of geometrical characteristics including characteristics of any geometrical enclosures and its total number of strokes, with said characteristics of geometrical enclosures comprising at least six types including:
    non-existence of any geometrical enclosures,
    at least one geometrical enclosure with no strokes inside,
    at least one geometrical enclosure with one stroke inside,
    at least one geometrical enclosure with two strokes inside,
    at least one geometrical enclosure with more than two strokes inside, and
    at least one irregular geometrical enclosure;
    (b) requesting a user to specify the selected set of geometrical characteristics including all applicable ones of said six types of geometrical enclosures based on the largest enclosures and total number of strokes of a character to be searched;

(c) searching through said data base for all characters having the selected set of geometrical characteristics same as those specified by the user and a particular number of strokes within a predetermined range of said total number of strokes including said total number; and (d) retrieving all said characters for identification of said character by the user.

13. The method of claim 12 wherein the selected set of geometrical characteristics of each character further comprises the characteristic of a first stroke which is one of only four types including a horizontal stroke, a vertical stroke, a relatively small, inverse slash-shaped stroke, and a curved, slash-shaped stroke that moves downward slanting to left and its variations.

14. The method of claim 12 wherein the selected set of geometrical characteristics of each character further comprises the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

15. The method of claim 12 wherein the selected set of geometrical characteristics of each character further comprises:

the characteristic of a first stroke which is one of only four types including a horizontal stroke, a vertical stroke, a relatively small, inverse slash-shaped stroke, and a curved, slash-shaped stroke that moves downward slanting to left and its variations; and the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

16. The method of claim 15 wherein in step (c) said predetermined range is between one stroke less to one stroke more than said total number.

17. The method of claim 15 wherein in step (c) comprises:

searching through said data base for all characters having a first stroke same as that specified by the user to form a first group;

searching through said first group for all characters having a last stroke same as that specified by the user to form a second group;

searching through said second group for all characters having geometrical enclosures same as those specified by the user to form a third group; and searching through said third group for all characters having particular number of strokes within said predetermined range of said total number to form a fourth group.

18. The method of claim 17 further comprising:
displaying all characters in said fourth group for identification of said character by the user.

19. The method of claim 18 wherein step (b) comprises allowing the user to have an option to specify number of crosses each formed by two strokes in said character if the user finds that said fourth group includes many characters and wherein step (c) further comprises searching through said fourth group for all characters having a number of crosses same as that specified by the user to form a fifth group.

20. The method of claim 19 further comprising displaying all characters in said fifth group for identification of said character by the user.

21. The method of claim 20 wherein step (b) further comprises:

displaying at least four questions relating, respectively, to the characteristic of said first stroke, the characteristic of said last stroke, the characteristics of any geometrical enclosures, and said total number of strokes, and an optional question relating to said number of crosses; and displaying at least three sets of preselected multiple choice answers with each set associated with one of said questions relating to said first and last strokes and said any geometrical enclosures for identification by the user.

22. The method of claim 21 further comprising displaying said character in both traditional and simplified versions and its corresponding pronunciation and explanation entries.

23. A method for retrieving characters from a data base storing a collection of characters, comprising:

(a) prearranging said data base so that each character in said data base is associated with a plurality of memory fields specifying a selected set of geometrical characteristics including characteristics of any geometrical enclosures and its total number of strokes, with said characteristics of geometrical enclosures comprising at least nine types including:

non-existence of any geometrical enclosures at least one geometrical enclosure with no strokes inside, at least one geometrical enclosure with one vertical stroke inside, at least one geometrical enclosure with one horizontal stroke inside, at least one geometrical enclosure with two vertical strokes inside, at least one geometrical enclosure with two horizontal strokes inside, at least one geometrical enclosure with two strokes forming a cross inside, at least one geometrical enclosure with more than two strokes inside, and at least one irregular geometrical enclosure;

(b) requesting a user to specify the selected set of geometrical characteristics including all applicable ones of said nine types of geometrical enclosures based on the largest enclosures and total number of strokes of a character to be searched;

(c) searching through said data base for all characters having the selected set of geometrical characteristics same as those specified by the user and a particular number of strokes within a predetermined range of said total number of strokes including said total number; and (d) retrieving all said characters for identification of said character by the user.

24. The method of claim 23 wherein the selected set of geometrical characteristics of each character further comprises the characteristic of a first stroke which is one of only four types including a horizontal stroke, a vertical stroke, a relatively small, inverse slash-shaped stroke, and a curved, slash-shaped stroke that moves downward slanting to left and its variations.

25. The method of claim 23 wherein the selected set of geometrical characteristics of each character further comprises the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

26. The method of claim 23 wherein the selected set of geometrical characteristics of each character further comprises:
the characteristic of a first stroke which is one of only four types including a horizontal stroke, a vertical stroke, a relatively small, inverse slash-shaped stroke, and a curved, slash-shaped stroke that moves downward slanting to left and its variations; and
the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

27. The method of claim 26 wherein step (c) said predetermined range is between one stroke less to one stroke more than said total number.

28. The method of claim 26 wherein step (c) comprises:
searching through said data base for all characters having a first stroke same as that specified by the user to form a first group;
searching through said first group for all characters having a last stroke same as that specified by the user to form a second group;
searching through said second group for all characters having geometrical enclosures same as those specified by the user to form a third group; and
searching through said third group for all characters having particular number of strokes within said predetermined range of said total number to form a fourth group.

29. The method of claim 28 further comprising:
displaying all characters in said fourth group for identification of said character by the user.

30. The method of claim 29 wherein step (b) comprises allowing the user to have an option to specify the number of crosses each formed by two strokes in said character if the user finds that said fourth group includes many characters and wherein step (c) further comprises searching through said fourth group for all characters having a number of crosses same as that specified by the user to form a fifth group.

31. The method of claim 30 further comprising displaying all characters in said fifth group for identification of said character by the user.

32. The method of claim 31 wherein step (b) further comprises:
displaying at least four questions relating, respectively, to the characteristic of said first stroke, the characteristic of said last stroke, the characteristics of any geometrical enclosures, and said total number of strokes, and an optional question relating to said number of crosses; and
displaying at least three sets of preselected multiple choice answers with each set associated with one of said questions relating to said first and last strokes and said any geometrical enclosures for identification by the user.

33. The method of claim 32 further comprising displaying said character in both traditional and simplified versions and its corresponding pronunciation and explanation entries.

34. A computer system for retrieving characters, comprising:
means for storing a data base containing a collection of characters, said data base prearranged so that each character in said data base is associated with a plurality of memory fields specifying a selected set of geometrical characteristics including characteristics of any geometrical enclosures and its total number of strokes of the character, with said characteristics of geometrical enclosures comprising at least six types including:
non-existence of any geometrical enclosures,
at least one geometrical enclosure with no strokes inside,
at least one geometrical enclosure with one stroke inside,
at least one geometrical enclosure with two strokes inside,
at least one geometrical enclosure with more than two strokes inside, and
at least one irregular geometrical enclosure;
input means for allowing a user to specify the selected set of geometrical characteristics including all applicable ones of said six types of geometrical enclosures based on the largest enclosures and total number of strokes of a character to be searched;
means, responsive to said input means, for searching through said data base for all characters having the selected set of geometrical characteristics same as those specified by the user and a particular number of strokes within a predetermined range of said total number of strokes including said total number; and
means, responsive to said searching means, for retrieving all said characters for identification of said character by the user.

35. The computer system of claim 34 wherein the selected set of geometrical characteristics of each character further comprises the characteristic of a first stroke which is one of only four types including a horizontal stroke, a vertical stroke, a relatively small, inverse slash-shaped stroke, and a curved, slash-shaped stroke that moves downward slanting to left and its variations.

36. The computer system of claim 34 wherein the selected set of geometrical characteristics of each character further comprises the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

37. The computer system of claim 34 wherein the selected set of geometrical characteristics of each character further comprises:
the characteristic of a first stroke which is one of only four types including a horizontal stroke, a vertical stroke, a relatively small, inverse slash-shaped stroke, and a curved, slash-shaped stroke that moves downward slanting to left and its variations; and the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

38. The computer system of claim 37 wherein said predetermined range is between one stroke less to one stroke more than said total number.

39. The computer system of claim 37 further comprising:

means, responsive to said retrieving means, for displaying all retrieved characters for identification of said character by the user.

40. The computer system of claim 39 wherein said input means allows the user to have an option to specify number of crosses each formed by two strokes in the character if the user finds that many characters are displayed, and wherein said searching means searches through said many characters for all characters having a number of crosses same as that specified by the user to form a particular group and said displaying means displays all characters in said particular group for identification of said character by the user.

41. The computer system of claim 40 wherein said displaying means initially displays at least four questions relating, respectively, to the characteristic of said first stroke, the characteristic of said last stroke, the characteristics of any geometrical enclosures and said total number of strokes, and an optional question relating to said number of crosses, along with at least three sets of preselected multiple choice answers with each set associated with one of said questions relating to said first and last strokes and said any geometrical enclosures for identification by the user.

42. The computer system of claim 41 wherein said data base also contains pronunciation and explanation entries for each character and said displaying means displays said character in both traditional and simplified versions and its corresponding pronunciation and explanation entries.

43. A computer system for retrieving characters, comprising:

means for storing a data base containing a collection of characters, said data base prearranged so that each character in said data base is associated with a plurality of memory fields specifying a selected set of geometrical characteristics including characteristics of any geometrical enclosures and its total number of strokes, with said characteristics of geometrical enclosures comprising at least nine types including:

non-existence of any geometrical enclosures,
at least one geometrical enclosure with no strokes inside,
at least one geometrical enclosure with one vertical stroke inside,
at least one geometrical enclosure with one horizontal stroke inside,
at least one geometrical enclosure with two vertical strokes inside,
at least one geometrical enclosure with two horizontal strokes inside,
at least one geometrical enclosure with two strokes forming a cross inside,
at least one geometrical enclosure with more than two strokes inside, and
at least one irregular geometrical enclosure;

input means for allowing a user to identify the selected set of geometrical characteristics including all applicable ones of said nine types of geometrical enclosures based on the largest enclosures and total number of strokes of a character to be searched, means, responsive to said input means, for searching through said data base for all characters having the selected set of geometrical characteristics same as those specified by the user and a particular number of strokes within a predetermined range of said total number of strokes including said total number; and means, responsive to said searching means for retrieving all said characters for identification of said character by the user.

44. The computer system of claim 43 wherein the selected set of geometrical characteristics of each character further comprises the characteristic of a first stroke which is one of only four types including a horizontal stroke, a vertical stroke, a relatively small, inverse slash-shaped stroke, and a curved, slash-shaped stroke that moves downward slanting to left and its variations.

45. The computer system of claim 43 wherein the selected set of geometrical characteristics of each character further comprises the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

46. The computer system of claim 43 wherein the selected set of geometrical characteristics of each character further comprises:

the characteristic of a first stroke which is one of only four types including a horizontal stroke, a vertical stroke, a relatively small, inverse slash-shaped stroke, and a curved, slash-shaped stroke that moves downward slanting to left and its variations; and the characteristic of a last stroke which is one of only five types including a horizontal stroke, a vertical stroke, a relatively small, inverse slash-shaped stroke, a curved, slash-shaped stroke that moves downward slanting to left and its variations, and a curved, inverse slash-shaped stroke that moves downward slanting to right and its variations.

47. The computer system of claim 46 wherein said predetermined range is between one stroke less to one stroke more than said total number.

48. The computer system of claim 46 further comprising:

means, responsive to said retrieving means, for displaying all retrieved characters for identification of said character by the user.

49. The computer system of claim 48 wherein said input means allows the user to have an option to specify the number of crosses each formed by two strokes in the character if the user finds that many characters are displayed and wherein said searching means searches through said many characters for all characters having a number of crosses same as that specified by the user to form a particular group and said displaying means displays all characters in said particular group for identification of said character by the user.

50. The computer system of claim 49 wherein said displaying means initially displays at least four questions relating, respectively, to the characteristic of said first stroke, the characteristic of said last stroke, the characteristics of any geometrical enclosures, and said total number of strokes, and an optional question relating to said number of crosses, along with at least three sets of preselected multiple choice answers with each set associated with one of said questions relating to said first and last strokes and said any geometrical enclosures for identification by the user.

51. The computer system of claim 50 wherein said data base also contains pronunciation and explanation entries for each character and said displaying means displays said character in both traditional and simplified versions and its corresponding pronunciation and explanation entries.

* * * * *